(12) United States Patent
Bonavoglia et al.

(10) Patent No.: US 10,391,739 B2
(45) Date of Patent: Aug. 27, 2019

(54) BI-COMPONENT FIBER AND FABRICS MADE THEREFROM

(71) Applicant: DOW GLOBAL TECHNOLOGIES LLC, Midland, MI (US)

(72) Inventors: Barbara Bonavoglia, Zurich (CH); Gert J. Claasen, Richterswil (CH); Jacquelyn A. Degroot, Sugar Land, TX (US); Selim Bensason, Rueschlikon (CH)

(73) Assignee: Dow Global Technologies LLC, Midland, MI (US)

( * ) Notice: Subject to any disclaimer, the term of this patent is extended or adjusted under 35 U.S.C. 154(b) by 299 days.

(21) Appl. No.: 14/349,906

(22) PCT Filed: Oct. 4, 2012

(86) PCT No.: PCT/US2012/058712
§ 371 (c)(1),
(2) Date: Apr. 4, 2014

(87) PCT Pub. No.: WO2013/052638
PCT Pub. Date: Apr. 11, 2013

(65) Prior Publication Data
US 2014/0248816 A1    Sep. 4, 2014

Related U.S. Application Data

(60) Provisional application No. 61/543,425, filed on Oct. 5, 2011.

(51) Int. Cl.
*D01F 8/06* (2006.01)
*D04H 13/00* (2006.01)
(Continued)

(52) U.S. Cl.
CPC ................ *B32B 5/26* (2013.01); *B32B 5/022* (2013.01); *B32B 5/24* (2013.01); *D01F 6/04* (2013.01);
(Continued)

(58) Field of Classification Search
None
See application file for complete search history.

(56) References Cited

U.S. PATENT DOCUMENTS 4,543,399 A    9/1985  Jenkins, III et al.
4,621,952 A    11/1986 Aronson
(Continued)

FOREIGN PATENT DOCUMENTS

EP    0833002 A1    4/1998
WO    WO2007136506   * 11/2007
(Continued)

OTHER PUBLICATIONS

Piel et al., ("Structure-Property Relationships of Linear and Long-Chain Branched Metallocene High-Density Polyethylene Characterized by Shear Rheology and SEC-MALLS", Macromol. Chem. Phys., 2006, 207, 26-38).*
(Continued)

*Primary Examiner* — Shawn Mckinnon

(57) ABSTRACT

The instant invention provides bi-component fibers and fabrics made therefrom. The bi-component fiber according to the present invention comprises: (a) from 5 to 95 percent by weight of a first component comprising at least one or more first polymers, based on the total weight of the bi-component fiber; (b) from 5 to 95 percent by weight of a second component comprising at least an ethylene-based polymer composition, based on the total weight of the bicomponent fiber, wherein said ethylene-based polymer composition comprises; (i) less than or equal to 100 percent
(Continued)

by weight of the units derived from ethylene; and (ii) less than 30 percent by weight of units derived from one or more α-olefin comonomers; wherein said ethylene-based polymer composition is characterized by having a Comonomer Distribution Constant in the range of from greater than from 100 to 400, a vinyl unsaturation of less than 0.1 vinyls per one thousand carbon atoms present in the backbone of the ethylene-based polymer composition; a zero shear viscosity ratio (ZSVR) in the range from 1 to less than 2; a density in the range of 0.920 to 0.970 g/cm$^3$, a melt index ($I_2$) in the range of from 10 to 40 g/10 minutes, a molecular weight distribution ($M_w/M_n$) in the range of from 1.8 to 3.0, and a molecular weight distribution ($M_z/M_w$) in the range of from less than 2; and wherein said bi-component fiber has a denier per filament in the range of from 0.5 to 10 g/9000 m.

5 Claims, 1 Drawing Sheet

(51) Int. Cl.

| | | |
|---|---|---|
| *B32B 5/26* | (2006.01) | |
| *B32B 5/24* | (2006.01) | |
| *D01F 6/04* | (2006.01) | |
| *B32B 5/02* | (2006.01) | |
| *D04H 1/4291* | (2012.01) | |
| *D04H 3/007* | (2012.01) | |
| *D04H 3/16* | (2006.01) | |

(52) U.S. Cl.
CPC .............. *D01F 8/06* (2013.01); *D04H 1/4291* (2013.01); *D04H 3/007* (2013.01); *D04H 3/16* (2013.01); *D04H 13/00* (2013.01); *Y10T 428/2929* (2015.01); *Y10T 442/291* (2015.04); *Y10T 442/637* (2015.04); *Y10T 442/66* (2015.04); *Y10T 442/681* (2015.04)

(56) References Cited

U.S. PATENT DOCUMENTS

| | | | |
|---|---|---|---|
| 4,933,149 A | | 6/1990 | Rhee et al. |
| 5,108,820 A | * | 4/1992 | Kaneko .................. D01F 8/06 428/198 |
| 5,405,922 A | | 4/1995 | DeChellis et al. |
| 5,462,999 A | | 10/1995 | Griffin et al. |
| 5,804,517 A | * | 9/1998 | Ishii .......................... D01F 8/06 442/361 |
| 6,242,545 B1 | | 6/2001 | Jejelowo et al. |
| 6,316,549 B1 | | 11/2001 | Chum et al. |
| 6,485,622 B1 | | 11/2002 | Fu |
| 6,548,432 B1 | * | 4/2003 | Hisada .................. D04H 3/007 442/327 |
| 6,627,713 B2 | | 9/2003 | Bernier et al. |
| 7,078,467 B1 | | 7/2006 | Kolb et al. |
| 8,372,931 B2 | | 2/2013 | Hermel-Davidock et al. |
| 2002/0034635 A1 | | 3/2002 | Terada et al. |
| 2006/0063457 A1 | * | 3/2006 | Matsui ...................... D01F 8/04 442/364 |
| 2009/0297810 A1 | * | 12/2009 | Fiscus ..................... B32B 27/32 428/220 |
| 2011/0092937 A1 | | 4/2011 | Pepper et al. |
| 2011/0165470 A1 | | 7/2011 | Dahringer et al. |

FOREIGN PATENT DOCUMENTS

| | | |
|---|---|---|
| WO | 2009/111185 A2 | 9/2009 |
| WO | 2010/006097 A1 | 1/2010 |
| WO | 2011/115702 A1 | 9/2011 |

OTHER PUBLICATIONS

Malmberg, Long-Chain Branching in Metallocene-Catalyzed Polyethylene Investigated by Low Oscillatory Shear and Uniaxial Extensional Rheology, Macromolecules (2002, 35, pp. 1038-1048.*
Vittorias et al., Detection and Qualification of Industrial Polyethylene branching Topologies via Fourier-Transform Rheology, NMR and Simulation using Pom-Pom model, Rheol Acta (2007, 46, pp. 321-340.*
Balke, Chromatography Polym., 1992, Chapter 12.
Balke, Chromatography Polym., 1992, Chapter 13.
Karjala, Detection of low levels of long-chain branching polyolefins, Annual Technical Conference—Society of Plastics Egineers, 2008, 66th, 887-891.
Kratochvil, Classical Light Scattering from Polymer Solutions, 1987.
Soares, 3(2) Polymer Reaction Engineering, 1995, vol. 131, p. 200.
Zimm, J. Chem, Phys., 1948, vol. 16, p. 1099.
PCT/US2012/058712, Jan. 25, 2013, International Search Report and Written Opinion.
PCT/US2012/058712, Apr. 23, 2014, International Preliminary Report on Patentability.

* cited by examiner

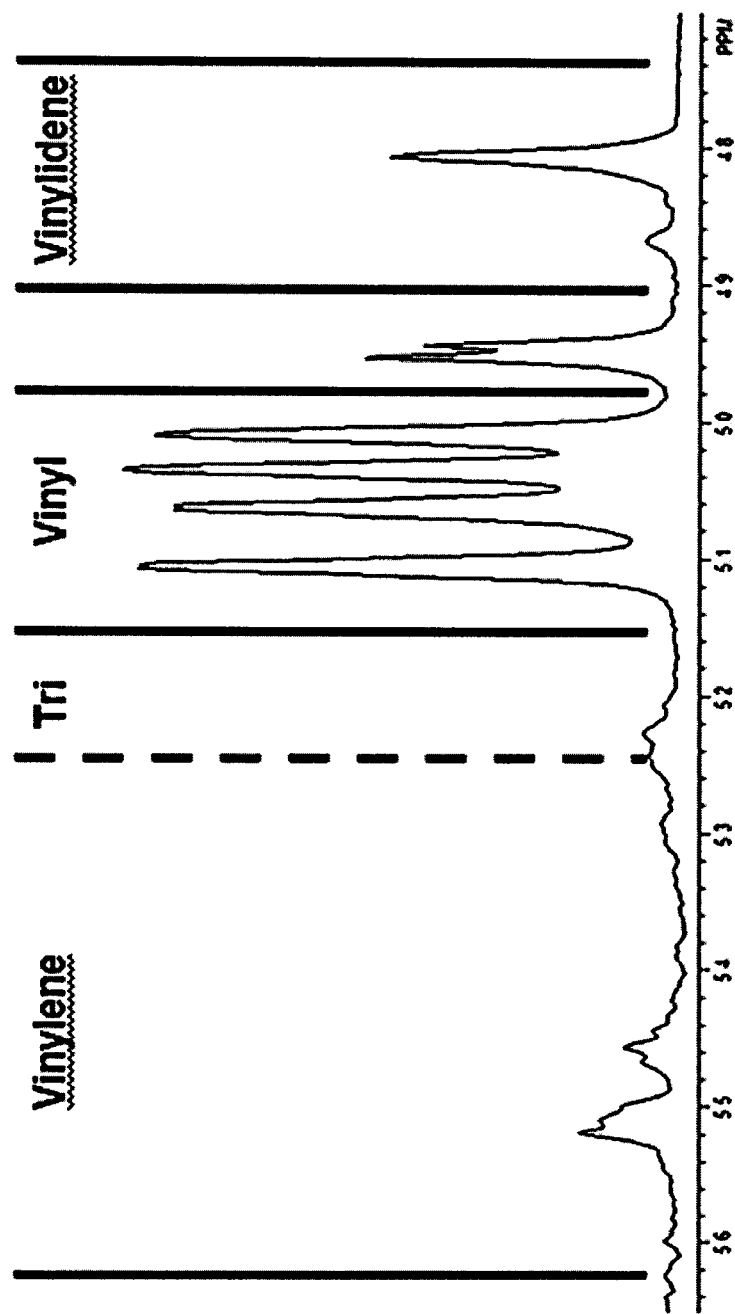

BI-COMPONENT FIBER AND FABRICS MADE THEREFROM

CROSS-REFERENCE TO RELATED APPLICATIONS

This application is a non-provisional application claiming priority from the U.S. Provisional Patent Application No. 61/543,425, filed on Oct. 5, 2011, entitled "SPUNBOND NONWOVEN FABRICS," the teachings of which are incorporated by reference herein, as if reproduced in full hereinbelow.

FIELD OF INVENTION

The instant invention relates to bi-component fibers and fabrics made therefrom.

BACKGROUND OF THE INVENTION

The use of polymeric compositions such as polyolefins in producing fibers is generally known. Exemplary polyolefins include, but are not limited to, polypropylene based compositions. Such fibers may be formed into fabrics, e.g. woven fabrics or non-woven fabrics. Different techniques may be employed to form such fabrics. Such techniques are generally known to persons of ordinary skill in the art.

Despite the research efforts in developing compositions suitable for fibers, there is still a need for bi-component fibers comprising an ethylene-based polymer composition providing improved processability while facilitating the production of non-woven fabrics having improved properties such as improved softness and drapeability.

SUMMARY OF THE INVENTION

The instant invention provides bi-component fibers and fabrics made therefrom.

In one embodiment, the instant invention provides a bi-component fiber comprising: (a) from 5 to 95 percent by weight of a first component comprising at least one or more first polymers, based on the total weight of the bi-component fiber; (b) from 5 to 95 percent by weight of a second component comprising at least an ethylene-based polymer composition, based on the total weight of the bicomponent fiber, wherein said ethylene-based polymer composition comprises; (i) less than or equal to 100 percent by weight of the units derived from ethylene; and (ii) less than 30 percent by weight of units derived from one or more α-olefin comonomers; wherein said ethylene-based polymer composition is characterized by having a Comonomer Distribution Constant in the range of from greater than from 100 to 400, a vinyl unsaturation of less than 0.1 vinyls per one thousand carbon atoms present in the backbone of the ethylene-based polymer composition; a zero shear viscosity ratio (ZSVR) in the range from 1 to less than 2; a density in the range of 0.920 to 0.970 g/cm³, a melt index ($I_2$) in the range of from 10 to 40 g/10 minutes, a molecular weight distribution ($M_w/M_n$) in the range of from 1.8 to 3.0, and a molecular weight distribution ($M_z/M_w$) in the range of from less than 2; and wherein said bi-component fiber has a denier per filament in the range of from 0.5 to 10 g/9000 m.

In another alternative embodiment, the instant invention further provides a fabric comprising one or more bi-component fibers, as described above.

In an alternative embodiment, the instant invention provides a bi-component fiber, and fabrics made therefrom, in accordance with any of the preceding embodiments, except that the bi-component fiber is sheath/core, islands in the sea, segmented pie, or combination thereof.

In an alternative embodiment, the instant invention provides fabrics, in accordance with any of the preceding embodiments, except that the fabric is a non-woven.

BRIEF DESCRIPTION OF THE DRAWINGS

FIG. 1 graphically depicts the vinylene, trisubstituted, vinyl, and vinylidene regions.

DETAILED DESCRIPTION OF THE INVENTION

The instant invention provides bi-component fibers and fabrics made therefrom. The bi-component fibers according to the present invention comprise: (a) from 5 to 95 percent by weight of a first component comprising at least one or more first polymers, based on the total weight of the bi-component fiber; (b) from 5 to 95 percent by weight of a second component comprising at least an ethylene-based polymer composition, based on the total weight of the bicomponent fiber, wherein said ethylene-based polymer composition comprises; (i) less than or equal to 100 percent by weight of the units derived from ethylene; and (ii) less than 30 percent by weight of units derived from one or more α-olefin comonomers; wherein said ethylene-based polymer composition is characterized by having a Comonomer Distribution Constant in the range of from greater than from 100 to 400, a vinyl unsaturation of less than 0.1 vinyls per one thousand carbon atoms present in the backbone of the ethylene-based polymer composition; a zero shear viscosity ratio (ZSVR) in the range from 1 to less than 2; a density in the range of 0.920 to 0.970 g/cm³, a melt index ($I_2$) in the range of from 10 to 40 g/10 minutes, a molecular weight distribution ($M_w/M_n$) in the range of from 1.8 to 3.0, and a molecular weight distribution ($M_z/M_w$) in the range of from less than 2; and wherein said bi-component fiber has a denier per filament in the range of from 0.5 to 10 g/9000 m.

The inventive bi-component fibers comprise from 5 to 95, for example from 50 to 95, or in the alternative from 50 to 80, or in the alternative from 60 to 80, percent by weight of a first component comprising at least one or more first polymer compositions, based on the total weight of the bi-component fiber. Such one or more first polymer compositions include, but are not limited to, propylene based polymers such as interpolymers (including copolymers) of propylene and one or more α-olefins, or propylene homopolymers, and polyester based polymers. The one or more first polymer compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The one or more first polymer compositions may contain from about 0.01 to about 10 percent by the combined weight of such additives, based on the weight of the ethylene-based polymer composition including such additives.

The inventive bi-component fibers comprise from 5 to 95, for example from 5 to 50, or in the alternative from 20 to 50, or in the alternative from 20 to 40, percent by weight of a second component comprising at least an ethylene-based polymer composition, based on the total weight of the bicomponent fiber.

The ethylene-based polymer composition comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene-based polymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene-based polymer composition is characterized by having a Comonomer Distribution Constant in the range of from greater than from 100 to 400, for example from 100 to 300, or from 100 to 200.

The ethylene-based polymer composition is characterized by having a zero shear viscosity ratio (ZSVR) in the range from 1 to less than 2, for example, from 1 to 1.9, or from 1 to 1.8 or from 1 to 1.7.

The ethylene-based polymer composition has a density in the range of 0.920 to 0.970 g/cm³. For example, the density can be from a lower limit of 0.920, 0.930, or 0.940 g/cm³ to an upper limit of 0.935, 0.940, 0.945, 0.950, 0.955, or 0.970 g/cm³.

The ethylene-based polymer composition has a molecular weight distribution ($M_w/M_n$) in the range of from 1.8 to 3.0. For example, the molecular weight distribution ($M_w/M_n$) can be from a lower limit of 1.8, 2, 2.1, or 2.2 to an upper limit of 2.5, 2.7, 2.9, or 3.0.

The ethylene-based polymer composition has a melt index ($I_2$) in the range of 10 to 40 g/10 minutes. For example, the melt index ($I_2$) can be from a lower limit of 10, 12, 15, 16, 17, 18, or 20 g/10 minutes to an upper limit of 18, 20, 24, 26, 28, 30, 35, or 40 g/10 minutes.

The ethylene-based polymer composition has a molecular weight ($M_w$) in the range of 15,000 to 150,000 daltons. For example, the molecular weight ($M_w$) can be from a lower limit of 15,000, 20,000, or 30,000 daltons to an upper limit of 100,000, 120,000, or 150,000 daltons.

The ethylene-based polymer composition has a molecular weight distribution ($M_z/M_w$) in the range of less than 3, for example, less than 2, or from 1 to 2.

The ethylene-based polymer composition has a vinyl unsaturation of less than 0.1 vinyls per one thousand carbon atoms present in the backbone of the ethylene-based polymer composition. For example, the vinyl unsaturation less than 0.08, less than 0.06, less than 0.04, less than 0.02, less than 0.01, or less than 0.001 vinyls per one thousand carbon atoms present in the backbone of the ethylene-based polymer composition.

In another embodiment, the ethylene-based polymer composition comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene-based polymer composition. The metal complex residues remaining from the catalyst system comprising a metal complex of a polyvalent aryloxyether in the ethylene-based polymer composition may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the ethylene-based polymer composition.

The ethylene-based polymer composition may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The ethylene-based polymer composition may contain from about 0.01 to about 10 percent by the combined weight of such additives, based on the weight of the ethylene-based polymer composition including such additives.

In one embodiment, ethylene-based polymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene-based polymer is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene-based polymer composition in at least one other reactor or a later part of a multi-part reactor, wherein at least one of the catalyst systems in step (a) or (b) comprises a metal complex of a polyvalent aryloxyether corresponding to the formula:

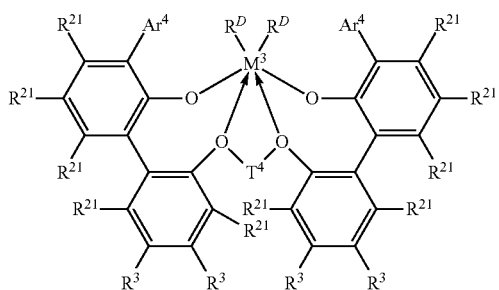

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene rings together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene-based polymer composition may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as anti-oxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

In one embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the ethylene-based polymer composition is exposed to oxygen. The ethylene-based polymer composition may then be transferred to an extruder to be pelletized. Such pelletization techniques are generally known. The linear low density polyethylene composition may further be melt screened. Subsequent to the melting process in the extruder, the molten composition is passed through one or more active screens, positioned in series of more than one, with each active screen having a micron retention size of from about 2 µm to about 400 µm (2 to $4 \times 10^{-5}$ m), and preferably about 2 µm to about 300 µm (2 to $3 \times 10^{-5}$ m), and most preferably about 2 µm to about 70 µm (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as generated by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. No. 4,933,149 and U.S. Pat. No. 6,627,713.

The hafnium based catalyst system used in the fluidized bed is preferably stored for service in a reservoir under a blanket of a gas, which is inert to the stored material, such as nitrogen or argon. The hafnium based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of ethylene-based polymer composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of the ethylene-based polymer composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C., or 75° C., or 80° C. to 90° C., or 95° C., or 100° C., or 110° C., or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

In order to maintain an adequate catalyst productivity, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene, which is the ratio of the gas concentration of comonomer moles in the cycle gas to the gas concentration of ethylene moles in the cycle gas. In one embodiment of the ethylene-based polymer composition production, the comonomer is present with ethylene in the cycle gas in a mole ratio range of from 0 to 0.1 (comonomer:ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $12_1$ and/or 12) of the ethylene-based polymer composition. In one embodiment, the ratio of hydrogen to total ethylene monomer (ppm $H_2$/mol % $C_2$) in the circulating gas stream is in a range of from 0 to 60:1 in one embodiment; from 0.10:1 (0.10) to 50:1 (50) in another embodiment; from 0 to 35:1 (35) in another embodiment; from 0 to 25:1 (25) in another embodiment; from 7:1 (7) to 22:1 (22).

In one embodiment, the process for producing the ethylene-based polymer composition comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the ethylene-based polymer composition.

The hafnium based catalyst system, as used herein, refers to a catalyst capable of catalyzing the polymerization of ethylene monomers and optionally one or more α-olefin co monomers to produce polyethylene. Furthermore, the hafnium based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \tag{1}$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br., hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

$$(CpR_5)_2HfX_2 \qquad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

The hafnium based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A. E. Hamielec in 3(2) POLYMER REACTION ENGINEERING 131 200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. No. 6,242,545 and U.S. Pat. No. 7,078,467, incorporated herein by reference.

The ethylene-based polymer composition can be formed into bi-component fibers via different techniques, for example, via melt spinning. Such bi-component fibers may be continuous filaments, or in the alternative, may be staple fibers. Continuous filaments may further be crimped, and then cut to produce staple fibers.

The first component of the bi-component fibers may be mono-constituent, i.e. only first polymer composition; or in the alternative, the first component of the bi-component fibers may be multi-constituent, i.e. a blend of two or more of first polymer composition. The second component of the bi-component fibers may be mono-constituent, i.e. only the ethylene-based polymer composition; or in the alternative, the second component of the bi-component fibers may be multi-constituent, i.e. a blend of the ethylene-based polymer composition and one or more other polymers.

The inventive fibers according to instant invention may be continuous filaments, or in the alternative, the inventive fibers may be staple fibers. Continuous filaments may further be optionally crimped, and then cut to produce staple fibers. The inventive fibers include, but are not limited to, bi-component fibers, and/or multi-component fibers. Exemplary bi-component fibers include, but are not limited to, sheath/core, islands in the sea, segmented pie, and combination thereof. The inventive fibers may include the inventive polyethylene composition according to the instant invention as an outer layer (i.e. second component), e.g. sheath, alone or in combination with one or more polymers. The term outer layer, as used herein, refers to at least any portion of the fiber surface. The inventive fibers may include the inventive polyethylene composition according to the instant invention as an inner layer (first component), e.g. core, alone or in combination with one or more polymers.

In melt spinning, one or more first polymers and the ethylene-based polymer composition or the blend of the ethylene-based polymer composition and one or more other polymers are melted, coextruded and forced through the fine orifices in a metallic plate called spinneret into air or other gas, where it is cooled and solidified forming the inventive bi-component fibers. The solidified filaments may be drawn-off via air jets, rotating rolls, or godets, and can be laid on a conveyer belt as a web.

The inventive bi-component fibers may have a denier per filament in the range of less than 50 g/9000 m. All individual values and subranges from less than 50 g/9000 m are included herein and disclosed herein; for example, the denier per filament can be from a lower limit of 0.1, 0.5, 1, 5, 10, 15, 17, 20, 25, 30, 33, 40, or 44 g/9000 m to an upper limit of 0.5, 1, 5, 10, 15, 17, 20, 25, 30, 33, 40, 44, or 50 g/9000 m. For example, the inventive bi-component fibers may have a denier per filament in the range of less than 40 g/9000 m; or in the alternative, the inventive bi-component fibers may have a denier per filament in the range of less than 30 g/9000 m; or in the alternative, the inventive bi-component fibers may have a denier per filament in the range of less than 20 g/9000 m; or in the alternative, the inventive bi-component fibers may have a denier per filament in the range of less than 10 g/9000 m; or in the alternative, the inventive bi-component fibers may have a denier per filament in the range from 0.5 to 10 g/9000 m.

The inventive bi-component fibers may have a tenacity in the range of 0.1 to 15 g/denier. All individual values and subranges from 0.1 to 15 g/denier are included herein and disclosed herein; for example, the tenacity can be from a lower limit of 0.1, 0.5, 1, 2, 3, 4, 5, 7, 9, or 10 g/denier to an upper limit of 0.5, 1, 2, 3, 4, 5, 7, 9, 10, 12, or 15 g/denier. For example, the inventive bi-component fibers may have a tenacity in the range of 0.1 to 10 g/denier; or in the alternative, the inventive bi-component fibers may have a tenacity in the range of 0.1 to 7 g/denier; or in the alternative, the inventive bi-component fibers may have a tenacity in the range of 0.1 to 5 g/denier; or in the alternative, the inventive bi-component fibers may have a tenacity in the range of 0.1 to 4 g/denier; or in the alternative, the inventive bi-component fibers may have a tenacity in the range of 0.1 to 3 g/denier; or in the alternative, the inventive bi-component fibers may have a tenacity in the range of 0.1 to 2 g/denier; or in the alternative, the inventive bi-component fibers may have a tenacity in the range of 0.1 to 1.5 g/denier; or in the alternative, the inventive bi-component fibers may have a tenacity in the range of 0.1 to 1.0 g/denier; or in the alternative, the inventive bi-component fibers may have a tenacity in the range of 1.5 to 5 g/denier; or in the alternative, the inventive bi-component fibers may have a tenacity in the range of 2 to 5 g/denier; or in the alternative, the inventive bi-component fibers may have a tenacity in the range of 2 to 4 g/denier; or in the alternative, the inventive bi-component fibers may have a tenacity in the range of 2.5 to 3.5 g/denier.

The inventive bi-component fibers according to the present invention may be formed into non-woven fabrics.

The non-woven fabrics according to the instant invention may be fabricated via different techniques. Such methods include, but are not limited to, melt blown process, spunbond process, carded web process, air laid process, thermo-calendering process, adhesive bonding process, hot air bonding process, needle punch process, hydroentangling process, electrospinning process, and combinations thereof. The fabrics can be further laminated to other non-wovens or films in a variety of lamination techniques such as adhesive lamination, thermal lamination, extrusion lamination, needlepunching, hydroentangling and combinations thereof.

In melt blown process, the inventive non-woven fabric is formed by extruding molten polymeric materials through a die, then, attenuating and/or optionally breaking the resulting filaments with hot, high-velocity air or stream thereby forming short or long fiber lengths collected on a moving screen where they bond during cooling.

In the alternative, the melt blown process generally includes the following steps: (a) Extruding strands from a spinneret; (b) Simultaneously quenching and attenuating the polymer stream immediately below the spinneret using streams of high velocity heated air; (c) Collecting the drawn strands into a web on a foraminous surface. Meltblown webs can be bonded by a variety of means including, but not limited to, autogeneous bonding, i.e. self bonding without further treatment, thermo-calendering process, adhesive bonding process, hot air bonding process, needle punch process, hydroentangling process, and combinations thereof.

In spunbond process, the fabrication of non-woven fabric includes the following steps: (a) extruding strands of one or more polymeric compositions from a spinneret; (b) quenching the strands of the one or more polymeric compositions with a flow of air which is generally cooled in order to hasten the solidification of the molten strands of the one or more polymeric compositions; (c) attenuating the filaments by advancing them through the quench zone with a draw tension that can be applied by either pneumatically entraining the filaments in an air stream or by wrapping them around mechanical draw rolls of the type commonly used in the textile fibers industry; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendering process, adhesive bonding process, hot air bonding process, needle punch process, hydroentangling process, and combinations thereof.

The inventive fabrics according to the instant invention possess improved softness and drapeability properties. The inventive fabrics according to the instant invention further provide higher tenacity fabrics. The inventive polyethylene composition further provides improved processability and spinnability. The low levels of vinyl unsaturations in the ethylene-based polymer composition are also important because such low levels of the vinyl unsaturations provide the instant ethylene-based polymer composition with improved processability.

The inventive non-woven materials can be used as top sheet and/or back sheet in diapers, wipes, and/or other hygiene absorbent products. Such non-woven material may have thickness, for example, in the range of 5 to 200 g/m$^2$.

The non-woven fabrics can be formed into multilayer structures. Such multilayer structures comprise at least 2 or more layers, wherein at least one or more layers are non-woven fabrics according to the present invention, and one or more other layers are selected from one or more melt blown non-woven layers, one or more wet-laid non-woven layers, one or more air-laid non-woven layers, one or more webs produced by any non-woven or melt spinning process, one or more film layers, such as cast film, blown film, one or more coating layers derived from a coating composition via, for example, extrusion coating, spry coating, gravure coating, printing, dipping, kiss rolling, or blade coating.

The non-woven fabrics can be used in various end-use application including, but not limited to, hygiene absorbent products such diapers, e.g. top sheet and/or back sheet in diapers, feminine hygiene articles, adult incontinence products, wipes, bandages and wound dressings, and disposable slippers and footwear, medical application such isolation gowns, surgical gowns, surgical drapes and covers, surgical scrub suits, caps, masks, and medical packaging.

Such non-woven material may have thickness, for example, in the range of 5 to 200 g/m$^2$.

EXAMPLES

The following examples illustrate the present invention but are not intended to limit the scope of the invention. The examples of the instant invention demonstrate that fibers comprising the ethylene-based polymer compositions facilitate the spinning of fine denier fibers and soft/drapeable spunbond non-woven fabrics while maintaining acceptable maximum peak tensile strength.

Inventive Example Compositions 1-5

Inventive Example Compositions 1-2, and 4-5 are ethylene-octene copolymers that are prepared via a solution polymerization process in a dual reactor configuration connected in series in the presence of a catalyst system comprising a metal complex of a polyvalent aryloxyether, as described above. The properties of ethylene-octene copolymer compositions of Inventive Example Compositions 1-2 and 4-5 are reported in Table 1.

Inventive Example Composition 3 is an ethylene-hexene copolymer that is prepared via a gaps phase polymerization process in a single reactor in the presence of a hafnium based catalyst system, as described above. The properties of the ethylene-hexene copolymer composition of Inventive Example Composition 3 are reported in Table 1.

Inventive Example Compositions 6-7 are ethylene-octene copolymers that were prepared via a solution polymerization process in a dual reactor configuration connected in series in the presence of a catalyst system comprising a metal complex of a polyvalent aryloxyether, as described above. The properties of ethylene-octene copolymer compositions of Inventive Example Compositions 6-7 are reported in Table 1A.

Comparative Example Compositions 1&2

Comparative Example Compositions 1 is ethylene-octene copolymers that are prepared via a solution polymerization process in a dual reactor configuration connected in series. The properties of ethylene-octene copolymer compositions of Comparative Example Composition 1 are reported in Table 2.

Comparative Example Composition 2 is ethylene-octene copolymer that is prepared via a solution polymerization process in a single reactor configuration. The properties of ethylene-octene copolymer composition of Comparative Example Composition 2 are reported in Table 2.

Inventive Monocomponent Fibers 1-7 (IMCF1-7) and Comparative Monocomponent Fibers 1-2 (CMCF1-2)

Inventive Example composition 1-7 and comparative compositions 1-2, as described herein, were formed into monocomponent fibers (IMCF1-7 and CMCF1-2, respectively) and tested for their average Ramp to Break according to the Draw Down Capability method and Ramping Procedure, described hereinbelow. The results are reported in Table 3, showing that Ethylene Based Compositions can reach, at equal throughput than Competitive Compositions, a higher maximum fiber spinning speed. This in turn means that finer fibers can be spun when using Ethylene Based Compositions compared to Comparative Compositions.

TABLE 1A

| Designation | Units | Inventive Composition 6 | Inventinve Composition 7 |
|---|---|---|---|
| Density | (g/cc) | 0.9356 | 0.9353 |
| $I_2$ | (dg/min) | 12.5 | 40.9 |
| $I_{10}/I_2$ | | 6.53 | 5.92 |
| $M_w/M_n$ | | 2.26 | 2.12 |
| $M_w$ | ×10³ | 53.3 | 39.4 |
| $M_z$ | ×10³ | 98.5 | 64.8 |
| $M_z/M_w$ | | 1.85 | 1.64 |
| CDC | | 149.4 | 188.5 |
| CDI | | 0.561 | 0.519 |
| STDEV | °C. | 8.6 | 11.5 |
| HalfWidth | °C. | 3.2 | 3.2 |
| HfWid/STDEV | | 0.38 | 0.28 |
| ZSVR | | 1.65 | 1.36 |
| Vinyls/10⁶ C | | 43 | 40 |

TABLE 2

| Designation | Units | Comparative Composition 1 | Comparative Composition 2 |
|---|---|---|---|
| Density | (g/cc) | 0.9343 | 0.9496 |
| $I_2$ | (dg/min) | 19.3 | 17.2 |
| $I_{10}/I_2$ | — | 6.59 | 6.66 |
| $M_w/M_n$ | — | 2.81 | 3.55 |
| $M_w$ | ×10³ | 49.6 | 54.8 |
| $M_z$ | ×10³ | 107.8 | 144.8 |
| $M_z/M_w$ | — | 2.17 | 2.64 |
| CDC | | 47.7 | 147.8 |
| CDI | | 0.166 | 0.950 |
| STDEV | °C. | 18.0 | 5.9 |
| HalfWidth | °C. | 6.3 | 3.8 |
| HfWid/STDEV | | 0.35 | 0.64 |
| ZSVR | | 1.39 | 1.07 |
| Vinyls/10⁶ C | | 168 | 323 |

TABLE 1

| Designation | Units | Inventive Composition 1 | Inventive Composition 2 | Inventive Composition 3 | Inventive Composition 4 | Inventive Composition 5 |
|---|---|---|---|---|---|---|
| Density | (g/cc) | 0.9352 | 0.9497 | 0.9505 | 0.9363 | 0.9503 |
| $I_2$ | (dg/min) | 17.9 | 18.1 | 17.6 | 24.7 | 25.1 |
| $I_{10}/I_2$ | — | 6.35 | 6.20 | 5.92 | 6.29 | 6.22 |
| $M_w/M_n$ | — | 2.20 | 2.18 | 2.89 | 2.17 | 2.33 |
| $M_w$ | ×10³ | 48.2 | 48.8 | 53.4 | 45.8 | 45.4 |
| $M_z$ | ×10³ | 82.5 | 82.4 | 104.3 | 80.1 | 78.8 |
| $M_z/M_w$ | — | 1.71 | 1.69 | 1.95 | 1.75 | 1.74 |
| CDC | | 163.6 | 122.4 | 127.2 | 169.1 | 140.5 |
| CDI | | 0.536 | 0.950 | 0.950 | 0.527 | 0.950 |
| STDEV | °C. | 9.7 | 4.0 | 4.8 | 10.2 | 4.6 |
| HalfWidth | °C. | 3.2 | 3.1 | 3.6 | 3.2 | 3.1 |
| HfWid/STDEV | | 0.33 | 0.78 | 0.75 | 0.31 | 0.68 |
| ZSVR | | 1.59 | 1.54 | 1.03 | 1.34 | 1.41 |
| Vinyls/10⁶ C | | 41 | 41 | 4 | 42 | 45 |

TABLE 3

| | Units | IMCF 1 | IMCF 2 | IMCF 3 | IMCF 4 | IMCF 5 | IMCF 6 | IMCF 7 | CMCF 1 | CMCF 2 |
|---|---|---|---|---|---|---|---|---|---|---|
| Ave Ramp to Break | meters/min | 3554 | 3305.8 | 3652.8 | 3500 | 3500 | 3366.2 | 3135.2 | 2373 | 2240 |
| Std. dev | | 201.4 | 344.6 | 162.3 | 0 | 0 | 109.2 | 421 | 300.4 | 371.4 |

Production of Bi-Component Fibers and Non-Woven Fabrics on Spunbond Line

Inventive Composition 1 is run on a single beam Reicofil 4 spunbond line in a 50:50 Core:Sheath Bicomponent configuration and is compared to Comparative Composition 2 run on the same line in the same configuration.

The Core of the bicomponent fiber is homopolymer polypropylene from DOW (former H502-25RG) currently supplied by Braskem under the name Polypropylene HP550R.

The machine (Reicofil 4 spunbond line) is equipped with a spinneret having 7377 holes (6827 holes/m) and an exit diameter of each hole of 0.6 mm with L/D ratio of 4.

Fibers of target 2 denier are spun and transformed into a nonwoven of target basis weight 20 GSM.

Following process parameters, reported in Table 4(a-c), are used:

TABLE 4a

| Bicomponent formulation | Total Throughput (kg/h) | Throughput per hole (g/hole/min) | Line Speed (m/min) |
|---|---|---|---|
| 50:50 homopolymer PP:Inventive Composition 1 | 224 | 0.5 | 175 |
| 50:50 homopolymer PP:Comparative Composition 2 | 228 | 0.52 | 175 |

TABLE 4b

| Bicomponent formulation | Core Extruder T (° C.) | Sheath Extruder T (° C.) | Cabin air Pressure (Pa) | Cabin air temperature (° C.) |
|---|---|---|---|---|
| 50:50 homopolymer PP:Inventive Composition 1 | 240 | 220 | 4000 | 22 |
| 50:50 homopolymer PP:Comparative Composition 2 | 240 | 222 | 4000 | 20 |

TABLE 4c

| Bicomponent formulation | Nip Pressure (N/mm) | Calander roll temperature (° C.) |
|---|---|---|
| 50:50 homopolymer PP:Inventive Composition 1 | 70 | Range 135-150° C. |
| 50:50 homopolymer PP:Comparative Composition 2 | 70 | Range 135-150° C. |

Bonding of the web takes place between an engraved roll and a smooth roll with a nip pressure of 50N·mm while maintaining the oil temperature of the smooth roll 2° C. below the oil temperature of the engraved roll; thus forming Inventive non-woven fabric 1 and Comparative non-woven fabric 2.

Nonwoven properties were tested and reported in Table 5.

TABLE 5

| Bicomponent Formulation | Calander roll temperature (° C.) | Tensile strength MD, N/ 50 mm | Elongation MD, % | Tensile Strength CD, N/ 50 mm | Elongation CD, % |
|---|---|---|---|---|---|
| Inventive non-woven fabric 1 (50:50 homopolymer PP:Inventive Composition 1) | 140 | 33 | 128 | 16.9 | 144 |
| | 145 | 32.9 | 127.7 | 19.6 | 137.3 |
| Comparative nonwoven fabric 2 (50:50 homopolymer PP:Comparative Composition 2) | 140 | 48.1 | 123.5 | 21.7 | 130.6 |
| | 145 | 47.8 | 120.9 | 23.6 | 139.5 |

Test Methods

Test methods include the following:

Density

Samples that are measured for density are prepared according to ASTM D-1928. Measurements are made within one hour of sample pressing using ASTM D-792, Method B.

Melt Index

Melt index, or I2, is measured in accordance with ASTM-D 1238, Condition 190° C./2.16 kg, and is reported in grams eluted per 10 minutes. $I_{10}$ is measured in accordance with ASTM-D 1238, Condition 190° C./10 kg, and is reported in grams eluted per 10 minutes.

Gel Permeation Chromatography (GPC)

The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as α) values mentioned later for polystyrene and polyethylene. See the Examples section for a demonstration of this procedure.

With 3D-GPC, absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., *J. Chem. Phys.,* 16, 1099 (1948)) and Kratochvil (Kratochvil, P., *Classical Light Scattering from Polymer Solutions*, Elsevier, Oxford, NY (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Crystallization Elution Fractionation (CEF) Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 μm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, >97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak} \cdot \text{temperature of } NIST1475a \cdot \text{Peak Temperature of Hexacontane}}{\text{Half} \cdot \text{height Width of } NIST\ 1475a + \text{Half-height Width of Hexacontane}}$$

where the column resolution is 6.0.

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distrubution Index}}{\text{Comonomer Distribution Shape Factor}} = \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated according to the following steps:

(A) Obtain a weight fraction at each temperature (T) ($w_T(T)$) from 35.0° C. to 119.0° C. with a temperature step increase of 0.200° C. from CEF according to the following Equation:

$$\int_{35}^{119.0} w_T(T) dT = 1$$

(B) Calculate the median temperature ($T_{median}$) at cumulative weight fraction of 0.500, according to the following Equation:

$$\int_{35}^{T_{median}} w_T(T) dT = 0.5$$

(C) Calculate the corresponding median comonomer content in mole % 1 at the ($C_{median}$) median temperature ($T_{median}$) by using comonomer content calibration curve according to the following Equation:

$$\ln(1 - \text{comonomer content}) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material according to the following Equation:

$$\ln(1 - \text{comonomer content}) = -\frac{207.26}{273.12 + T} + 0.5533$$

$$R^2 = 0.997$$

wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according the following Equation:

$$Stdev = \sqrt{\sum_{35.0}^{119.0} (T - T_p)^2 \times w_T(T)}$$

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of c vs. t, where c is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50: 50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NCH_2=I_{total}/2$$

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in the graph in FIG. 1.

The number of unsaturation unit for vinylene, trisubstituted, vinyl and vinylidene are calculated:

$$N_{vinylene}=I_{vinylene}/2$$

$$N_{trisubstituted}=I_{trisubstitute}$$

$$N_{vinyl}=I_{vinyl}/2$$

$$N_{vinylidene}=I_{vinylidene}/2$$

The unsaturation unit/1,000,000 carbons is calculated as following:

$$N_{vinylene}/1{,}000{,}000C=(N_{vinylene}/NCH_2)*1{,}000{,}000$$

$$N_{trisubstituted}/1{,}000{,}000C=(N_{trisubstituted}/NCH_2)*1{,}000{,}000$$

$$N_{vinyl}/1{,}000{,}000C=(N_{vinyl}/NCH_2)*1{,}000{,}000$$

$$N_{vinylidene}/1{,}000{,}000C=(N_{vinylidene}/NCH_2)*1{,}000{,}000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64s, D1 14s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64s, D1 1 s, D13 13s. The modified pulse sequences for unsaturation with Bruker AVANCE 400 MHz spectrometer are shown below:

```
;lclprf2_zz
prosol relations=<lcnmr>
#include <Avance.incl>
"d12=20u"
"d11=4u"
1 ze
  d12 pl21:f2
2 30m
  d13
  d12 pl9:f1
  d1 cw:f1 ph29 cw:f2 ph29
  d11 do:f1 do:f2
  d12 pl1:f1
  p1 ph1
  go=2 ph31
  30m mc #0 to 2 F0(zd)
exit
ph1=0 2 2 0 1 3 3 1
ph29=0
ph31=0 2 2 0 1 3 3 1
```

Maximum Cabin Air Pressure

Spunbond cabin air pressure was used to attenuate the fibers to a maximum level. The maximum level was chosen as the highest cabin air pressure that the fiber curtain could sustain with good spinning stability. Stability was described as the highest cabin air pressure where no repeated fiber breaks occur as determined by visual inspection. An increase in cabin air pressure beyond the maximum cabin air pressure would result in repeated fiber breaks. Fabric samples were collected at the nominal 2 denier and minimum cabin air pressure of 3000 Pa.

Bonding Window

Bonding window is determined by the range of surface temperatures or heated oil temperatures of the calendar roll and smooth roll which can be used in the bonding process of making a spunbonded nonwoven fabric to obtain the desired balance of physical properties (such as tensile strength, abrasion resistance and elongation) of the fabric. The peak bonding temperature is determined to be the oil temperature of the calendar roll at which the highest MD Peak Tensile Strength-is achieved for a spunbond fabric.

Tensile Testing

The following procedures are used to generate tensile testing data for nonwoven fabrics of the present invention. Basis weight may be determined by measuring the weight of a known area of fabric. For example, basis weight in $g/m^2$ may be determined according to ASTM D 3776.

a) ERT 60.2-99 Standard Conditioning; b) ERT 130.2—89 Nonwovens Sampling; c) ERT 20.2—89 and Iso test methods a) ISO 554—76 (E) b) ISO 186: 1985.

Peak tensile strength and elongation at break of the nonwoven materials are determined using the following procedures. The test method describes two procedures Option A —IST 110.4 —02 and Option B—ERT 20.2—89 for carrying out nonwoven material tensile tests. These procedures use two types of specimens which are Option A—25 mm (1.0 in.) strip tensile and Option B—50 mm (2.0 in.) strip tensile. Option B was used for samples in this report. A test specimen is clamped in a tensile testing machine with a distance between the jaws of the grips of 200 mm and a force is applied to extend the test specimen at a rate of 100 mm/min until it breaks. Values for the breaking force and elongation of the test specimen are obtained from a computer interface.

Peak tensile strength is the maximum or peak force applied to a material prior to rupture. Materials that are brittle usually rupture at the maximum force. Materials that are ductile usually experience a maximum force before rupturing. A high precision electronic test instrument is used that measures the elongation at break and peak tensile strength of materials while pulling forces are applied to the material. The force which is exerted on the specimen is read directly from the testing machine or graphs obtained during the test procedure. For each sample at least 5 specimens were tested and the average was calculated and used for the peak tensile strength observed for the sample.

Elongation at Break is the deformation in the direction of load caused by a tensile force. Elongation is expressed as a ratio of the length of the stretched material as a percentage to the length of the unstretched material. Elongation at break is determined at the point where the stretched material breaks. The apparent elongation is determined by the increase in length from the start of the force-extension curve to a point corresponding with the breaking force, or other specified force. The apparent elongation is calculated as the percentage increase in length based on the gage length (Lo).

$$\text{Elongation }(\%) = \frac{L_{break} - L_o}{L_o} \times 100\%$$

Hills Line Fiber Spinning Conditions and Ramp-to-Break Methodology for Determining Maximum Draw Down Speed of Fibers Ramp-to-break is a method for determining the maximum line speed for drawing down fibers on a Hills Continuous Filament Fiber Spinning line as achieved by increasing the take up speed of the filament bundle. This is accomplished in a ramping method to a point where at least one fiber break occurs. The highest speed that a material can be run for a minimum of 30 seconds without a single fiber break is the maximum draw down speed or ramp-to-break speed.

Fibers are spun on a Hills Bicomponent Continuous Filament Fiber Spinning Line at a throughput rate of 0.50 ghm. A Hills Bicomponent die is used operating at a 50/50 core/sheath ratio with same material fed into each extruder. The die configuration consists of 144 holes, with a hole diameter of 0.6 mm and an L/D of 4/1.

Quench air temperature and flow rate are set at 15 deg C., and 30% of maximum, respectively.

Extruder profiles are adjusted to achieve a melt temperature of 235-238 deg C.

Fiber bundle is wrapped around the godets a minimum of 4 times, with no draw between the 2 godets, and then evacuated to an aspirator so as to eliminate any variability due to winder.

Draw Down Capability

Ramp-to-break is a method for determining the maximum line speed for drawing down fibers on a Hills Continuous Filament Fiber Spinning line as achieved by increasing the take up speed of the filament bundle. This is accomplished in a ramping method to a point where at least one fiber break occurs. The highest speed that a material can be run for a minimum of 30 seconds without a single fiber break is the maximum draw down speed or ramp-to-break speed.

Ramping Procedure

Material is ramped from a sufficiently low lines speed, e.g. 1500 mpm or lower, if necessary. Material is run at this line speed for 30 seconds and observed for any fiber breaks. If no fiber breaks then the godet speed is ramped at a rate of 500 mpm over 30 seconds. The material is run for 30 seconds at each interim point while checking for breaks. This is done until a break is achieved. The speed at which the break occurs is recorded. The process is repeated a minimum of three times and the average is recorded as the maximum draw down speed via the ramp-to-break methodology.

Fiber Tensile Testing

Two denier fibers produced according the specifications above for Hills Line Fiber Spinning are tested according to ASTM Standard D 2256. The 144 strands from the Hills Continuous Filament Fiber Spinning line are tested as a single bundle using the MTS Sintech 5/G. Conventional fiber horn grips are used. Jaws are set an initial length of 8 inches. Jaw speed is set to 16 inches/minute. Five replicates are run and the peak load is recorded as the maximum fiber tensile strength. The elongation at break is recorded as the maximum elongation.

The present invention may be embodied in other forms without departing from the spirit and the essential attributes thereof, and, accordingly, reference should be made to the appended claims, rather than to the foregoing specification, as indicating the scope of the invention.

We claim:

1. A bi-component fiber comprising:
    from 5 to 95 percent by weight of a first component comprising at least one or more first polymers, based on the total weight of the bi-component fiber;
    from 5 to 95 percent by weight of a second component comprising at least an ethylene-based polymer composition, based on the total weight of the bicomponent fiber, wherein said ethylene-based polymer composition comprises;
    at least 70 percent by weight of the units derived from ethylene; and
    less than 30 percent by weight of units derived from one or more α-olefin comonomers; and
    wherein said ethylene-based polymer composition is characterized by having a Comonomer Distribution Constant in the range of from 135 to 200, a vinyl unsaturation of less than 0.1 vinyls per one thousand carbon atoms present in the backbone of the ethylene-based polymer composition; a zero shear viscosity ratio (ZSVR) in the range from 1.3 to less than 2; a density in the range of 0.920 to 0.970 g/cm$^3$, a melt index ($I_2$) in the range of from 10 to 40 g/10 minutes, a molecular weight distribution ($M_w/M_n$) in the range of from 1.8 to 3.0, a molecular weight distribution ($M_z/M_w$) in the range of from less than 2, and;
    wherein said bi-component fiber has a denier per filament in the range of from 0.5 to 10 g/9000 m.

2. The bi-component fiber of claim 1, wherein said bi-component fiber is sheath/core, islands in the sea, segmented pie, or combination thereof.

3. A fabric comprising one or more bi-component fibers of claim 1.

4. The fabric of claim 3, wherein said fabric is a non-woven.

5. The fabric of claim 3, wherein said fabric is a spunbond non-woven.

* * * * *